Sept. 24, 1963    J. H. GRAHAM    3,104,892
STABILIZER HOLDER FOR TRACTOR HITCH
Filed Jan. 24, 1961
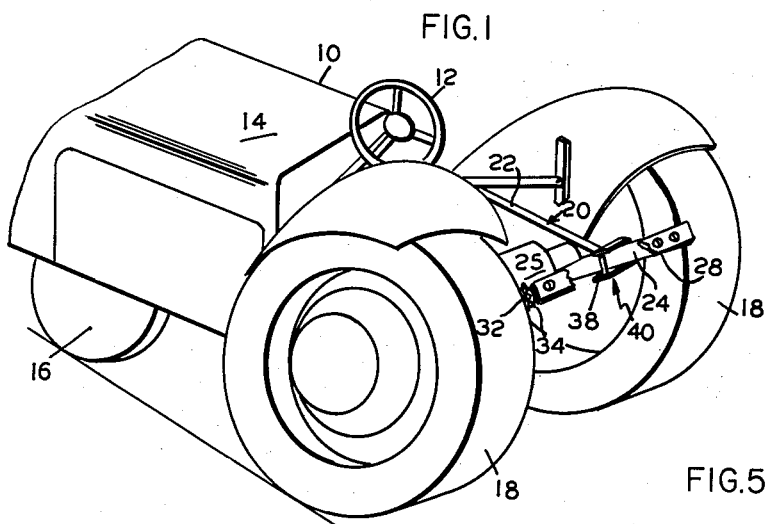
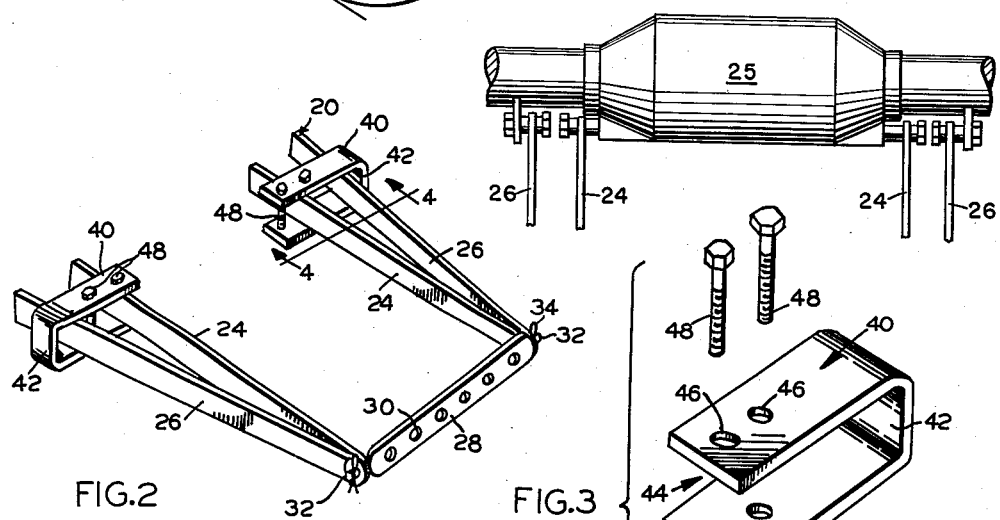
INVENTOR.
JAMES H. GRAHAM
BY
ATTORNEY

United States Patent Office

3,104,892
Patented Sept. 24, 1963

3,104,892
STABILIZER HOLDER FOR TRACTOR HITCH
James H. Graham, Abbeville, Ga.
Filed Jan. 24, 1961, Ser. No. 84,728
2 Claims. (Cl. 280—460)

This invention relates to a stabilizer holder for a tractor hitch, and particularly to an attachment for tractor hitches, especially the "three-point hitch" arrangements, to provide a means of holding the stabilizer bar or element in association with the main draw bar members so that changes may be made in implements with maximum facility.

Many present day tractor-implement hitch arrangements employ outwardly extending draw bar links removably attached to the ends of an implement hitch bar and additionally, there is provided a pair or more of stabilizer arms which extend substantially in divergence with the draw bar links and also attach to the implement bar.

One typical tractor hitch device used for pulling implements on a farm tractor and the like comprises the usual three-point hitch arrangement employing spaced draw bar members extending behind the tractor and pivotally attached thereto and a transverse implement connecting member attaching said space members together for mutual movement thereon. A lifting apparatus, mechanical, hydraulic, or other, is provided between another stationary point on the tractor and a second point intermediate the length of one or both of the draw bar links for lifting the entire draw bar hitch arrangement from a lowered operating position to a raised retracted position. Ofttimes implements are attached to the terminal ends of the transverse connecting member, which places the implements immediately next to a respective draw bar link. For this purpose, the hitch is usually elevated to its maximum elevated position. Also conventionally attached with the hitch arrangement is a pair of outwardly extending stabilizer arms which attach pivotally, each on a respective side of the tractor and each also onto and outwardly of a respective draw bar member. In changing equipment on the tractor, it is usually necessary to detach the stabilizer arms from the rest of the hitch, and since the stabilizers are pivotally attached, dropping them to the ground to free the hands of the operator so that he can make the change in the equipment on the hitch. This is time consuming, awkward and is difficult for one person to perform alone. The present invention provides a modification of the hitch whereby the stabilizer arms are held loosely in conjunction with the draw bar links (or lower control links as they are sometimes called) and whereby the stabilizer arms and a respective lower control link operate upwardly and downwardly together as a unit.

Generally described, without restriction on the scope of the invention as defined in the appended claims, the present device constitutes an attachment or modification to any type of tractor-implement hitch arrangement which employs a pair of rearwardly extending drag link or similar members each having associated therewith an outwardly extending stabilizer member and both of said drag links and stabilizer members on each side being connected together at a common point with the stabilizer being outboard or outwardly of the drag link. The present device is a "U-shaped" member having a pair of transversely arranged bolt members forming a confined passage therebetween, and both of said bolt members are removable from said "U-shaped" member for attaching the detachable device on the hitch. The device is attached in place by removing the two bolts and fitting the "U-shaped" member over the outboard stabilizer arm and inwardly across the inside drag link member and then replacing the two bolts, one on each side of said drag link member to confine same therein. In the type of drag link and stabilizer arrangement where each drag link and stabilizer member has an open eye or socket therein fitting over a pin on the transverse connecting member, there is sufficient room inside of the "U-shaped" member for the stabilizer arm to be shifted and removed from the pin and moved out of the way so that implements or the like may be attached on the pin between the stabilizer member and the drag link.

A primary object of this invention is to provide a holder for holding a tractor hitch stabilizer member on a drag link member so that implements may be changed without the stabilizer member dropping to the ground.

An additional object of this invention resides in the particular construction of the holder set forth in the preceding paragraph, utilizing a loose-connecting holder-member fitted over one of the stabilizer or drag link members and being loosely bolted in place on the other thereof.

Still another object of this invention resides in the construction of the device wherein a "U-shaped" holder member is removably fitted over and across both the stabilizer members and the drag link members and is attached in place by a pair of transverse bolts fitting through and adjacent the end of the "U-shaped" member, there being one on each side of the drag link.

An additional object of this invention resides in the provision of a mechanical holder which is normally attached to one of either the stabilizer or drag link members and to the corresponding and respective stabilizer member to hold same in loose engagement so that implements may be changed without the stabilizer member and the drag link member becoming distantly detached.

Other and further objects and advantages of my invention will become apparent upon reading the following specification taken in conjunction with the accompanying drawings, in which:

FIG. 1 is a diagrammatic view of a tractor with a typical three-point hitch device employing stabilizer arms or members (sometimes called lower links) and drag link arms or members loosely connected in place by the present holder.

FIG. 2 is a perspective view of the stabilizer arm and drag link arm arrangement of a typical hitch as held in place by the present holders bolted thereon.

FIG. 3 is a perspective view of the holder of the present invention partly disassembled.

FIG. 4 is a cross-sectional view of one of the holders in place on the stabilizer and drag link arms as taken substantially along lines 4—4 in FIG. 2.

FIG. 5 is a partial rear view of the tractor rear axle housing, showing details of the mounting means for the stabilizer and drag link arms.

The present invention may be employed in any instance in conjunction with a tractor hitch device wherein there are opposed pairs of stabilizer and drag link arms mutually connected to a respective end of a transverse implement member. For purposes of illustration in the present case, there is shown diagrammatically a typical tractor 10 having steering apparatus 12 and engine cover 14, front wheels 16 and spaced rear wheels 18, all of conventional construction and well known in the tractor art. Located at the rear of the tractor there is in the present drawings a typical hitch arrangement 20, in this case of the three-point type, consisting of a pair of power actuated lifting members 22 (one not shown) adapted to operate by power produced from the vehicle, a rearwardly extending frame arrangement comprising a pair of pivotally mounted drag or draw bar members, links or arms 24, each pivotally connected to the rear of the tractor as on the differential housing 25 thereof, and there being a pair of such members 24 arranged on opposite sides of the vehicle inside of the wheels 18. Also pivotally mounted on the rearward portion of the tractor, as on the differential or axle housing 25, is a pair of outboard, spaced stabilizer arms or members 26, there being one of these for each of the respective drag link arms 24, whereby the respective drag link arm 24 and its respective stabilizer member 26 cooperate together to stabilize the hitch arrangement. The respective pairs of diverging stabilizer and drag link members 24, 26 are connected together about the ends of a transverse hitch and implement bar 28 having a plurality of holes 30 therein providing various places at which implements or the like (not shown) may be attached.

Conventionally, on the implement bar 28 shown in the present drawings, the ends of the bar are formed with integral shafts or pins 32 protruding therefrom and the ends of all of the stabilizer and the corresponding ends draw bar members 24, 26 are formed with open holes or eyes therein whereby the members 24, 26 are fitted over and onto a respective pin 32 with the draw bar links being inwardly on the implement bar 28 and the stabilizer's arms being thereagainst and outboard thereof. These members are held in place on the implement bar 28 by means of large cotter keys or similar pins 34.

The foregoing structure essentially as described is conventional equipment and is well known in the tractor art and provides merely a basis or basic structure to which the present device is applied.

The implement holder 40 of the instant invention, in the one embodiment thereof shown in the present drawings, is constructed from a large, heavy steel bar or strap material formed as a continuous "U-shaped" member having a closed end 42 and an open mouth or end 44 into which suitable connections are made. Spaced, matching holes 46 drilled through the body of the "U-shaped" member 40 receive respective bolts 48 therein held in place by respective nuts 50 and forming therebetween a channel or confined space.

The holder 40 is attached in place on the stabilizer and drag link members 24, 26 by removing the bolts 48 and placing the holder over both of the pairs of drag link and stabilizer members 24, 26 on that particular side as in the manner shown in FIG. 2. Then the two bolts 48 are replaced in their respective openings 46 to extend transversely through the holder 40 and to confine the drag link member 24 therebetween. There is purposely a certain amount of limited play or movement between the bolts 48 and the drag link member 24 as well as between the body and end of the holder 40 and the stabilizer member 26 therein. This permits the lifting device 22 to operate without any binding or interference and also allows a certain amount of play or tolerance which may be used to separate the members 24, 26 from each other and from the transversely extending implement hitch bar 28.

Normally in operation and use of the hitch arrangement shown in the present drawings without the presence of the present invention, when it becomes desirable to separate the stabilizer members 26 from the drag link members 24 and to place something between the ends thereof and on the pins 32 of the transverse implement 28, it becomes necessary for one person to drop each of the stabilizer members 26 to the ground in order to perform the operation necessary to place that something on the pins 32. With the present arrangement, the holder 40 remains in place at all times and when it becomes desirable to separate the stabilizer arms 26 from the draw bar members 24, the cotter pin 34 is removed from a respective pin 32 on that side and the stabilizer member 26 is lifted from the pin and loosely moved in the holder 40 sufficiently to separate it from the pin 32 and from its association with the draw bar link 24, but at the same time holding the stabilizer member 26 loosely attached with and within the general location of the pin 32 and drag links 24 so that it may be manipulated easily by one person in replacing same thereon.

While I have shown and described a particular embodiment of my invention, together with suggested use and operation thereof, this is in no way any restriction on the scope thereof, since various alterations, substitutions, variations, eliminations, and deviations may be made in the embodiment shown and described without departing from the scope of my invention as defined in the appended claims.

I claim:

1. A holder for use on a tractor hitch, which hitch includes a pair of spaced draw bar arms, each of said arms having one end attached to the tractor and the other end detachably attached on a respective end of a transverse implement member and also a pair of stabilizer members wherein there is a respective stabilizer member located outwardly of each of said respective draw bar members and wherein each of said stabilizer members has one end pivotally attached to a rigid portion of the tractor for pivoting about a horizontal axis, and the other end attached to the end of said transverse implement member, a holder for loosely connecting and associating each stabilizer member with a respective draw bar arm associated therewith, said holder being formed as a "U-shaped" member having a pair of legs, a closed end on one end thereof and an open attaching end on the other end thereof, each said "U-shaped" member being attached over the respective stabilizer member and the associated draw bar arm and means being attachable through said legs to close the open end of said U-shaped member and forming a passageway in said member and said respective draw bar arm being retained in said passageway whereby said stabilizer member and draw bar arm on each side of said hitch are loosely associated together to be retained in close association when removed from said implement member.

2. A holder for use on a tractor hitch, which hitch includes a pair of spaced draw bar arms, each of said arms having one end attached to the tractor and the other end detachably attached on a respective end of a transverse implement member and also a pair of pivotally mounted stabilizer members wherein there is a stabilizer member located outwardly of each of said respective draw bar arms and wherein each of said stabilizer members has one end pivotally attached to a rigid portion of the tractor for pivoting about a horizontal axis and the other end removably attached to the end of said transverse implement member, a holder for loosely connecting and associating each member with a respective draw bar arm, said holder being formed as an open member having a pair of legs, a closed side and an open attaching side, a pair of longitudinally spaced and aligned bolt openings on each leg of said member, said holder member being attached over each stabilizer member and a respective draw bar arm and bolts disposed in said aligned openings to form a confined passageway therebetween, said respective draw bar arm being disposed in said passageway, whereby said stabilizer and draw bar arm on each side of said hitch are loosely associated together to be retained in close association when removed from said implement member.

References Cited in the file of this patent

UNITED STATES PATENTS

| | | |
|---|---|---|
| 1,969,023 | Mader | Aug. 7, 1934 |
| 2,232,407 | Riesterer | Feb. 18, 1941 |
| 2,461,885 | Estes | Feb. 15, 1949 |
| 2,673,509 | Wilson | Mar. 30, 1954 |
| 2,738,206 | Loughner | Mar. 13, 1956 |